United States Patent [19]

Damien

[11] Patent Number: 5,617,416
[45] Date of Patent: Apr. 1, 1997

[54] NETWORK WITH DATA RATE ADJUSTMENT FOR VIRTUAL CIRCUITS WITH ASYNCHRONOUS TIME DIVISION MULTIPLEX TRANSMISSION

[75] Inventor: Souad Damien, Palaiseau, France

[73] Assignee: U.S. Philips Corporation, New York, N.Y.

[21] Appl. No.: 102,451

[22] Filed: Aug. 5, 1993

[30] Foreign Application Priority Data

Aug. 6, 1992 [FR] France ................... 9209401

[51] Int. Cl.$^6$ .................................. H04L 12/56
[52] U.S. Cl. .................... 370/391; 370/395; 370/416; 370/468
[58] Field of Search .............................. 370/60, 60.1, 79, 370/84, 85.6, 94.1, 94.2

[56] References Cited

U.S. PATENT DOCUMENTS 5,189,672  2/1993  Le Bihan ................... 370/94.1
5,287,347  2/1994  Spanke ..................... 370/85.6

FOREIGN PATENT DOCUMENTS 2653284  4/1991  France .

Primary Examiner—Melvin Marcelo
Attorney, Agent, or Firm—Michael J. Balconi-Lamica; David Schreiber

[57] ABSTRACT

An ATM network including a plurality of channels comprises a cell memory MC comprising r buffers for virtual circuits (MC1, ..., MC2). The output cells of MC carried by a multiplex DNO are read by a readout address section circuit. The circuit also comprises a mechanism for establishing a one-to-one relationship between each activated channel and a predetermined level of priority, a rhythm synthesis table, a mechanism dependent on the output of the rhythm table for activating pulse signals which have frequencies that correspond to the data rates of activated channels, an automatic timing unit and a mechanism for selecting a channel of highest priority at each cell time.

18 Claims, 3 Drawing Sheets

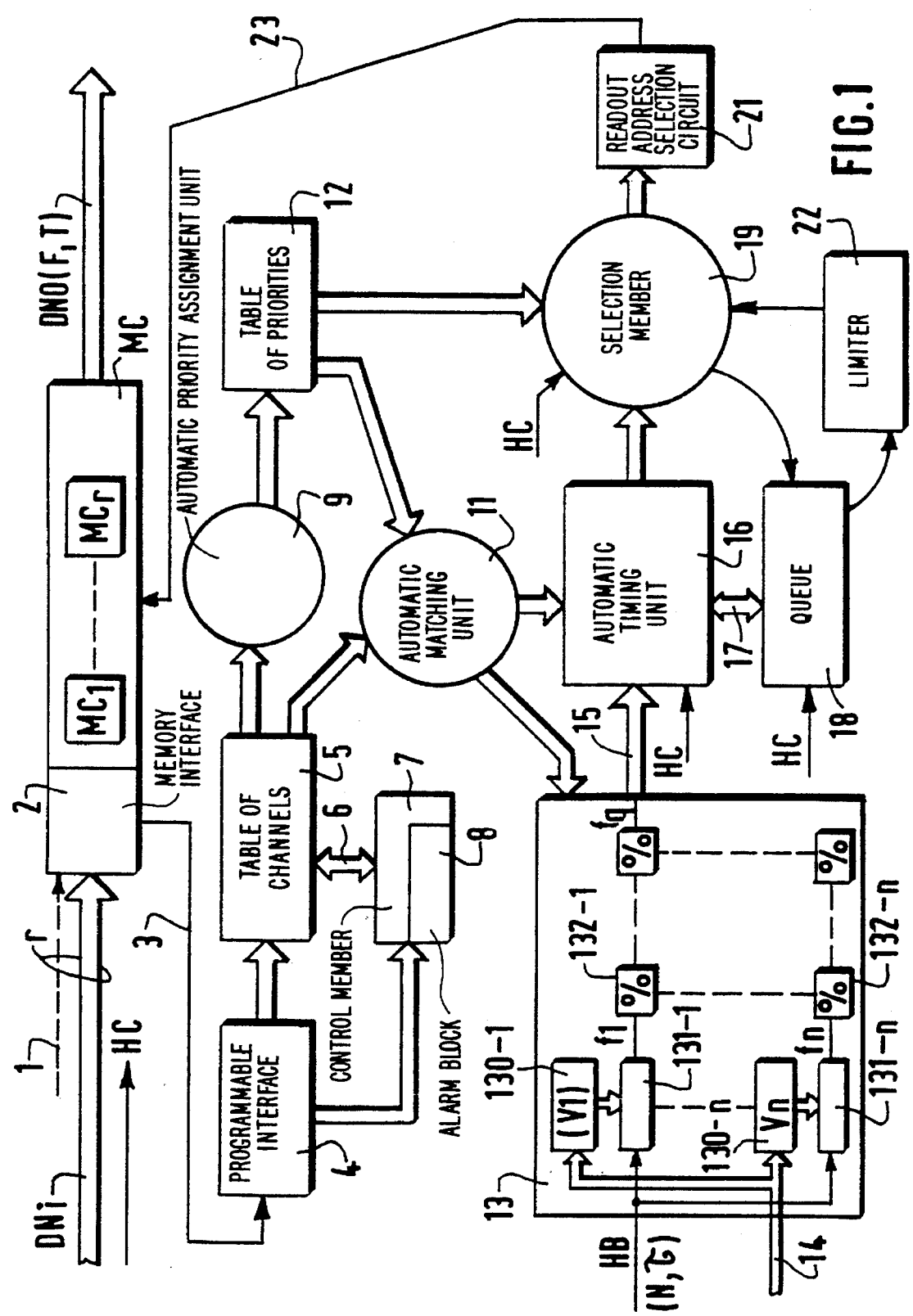

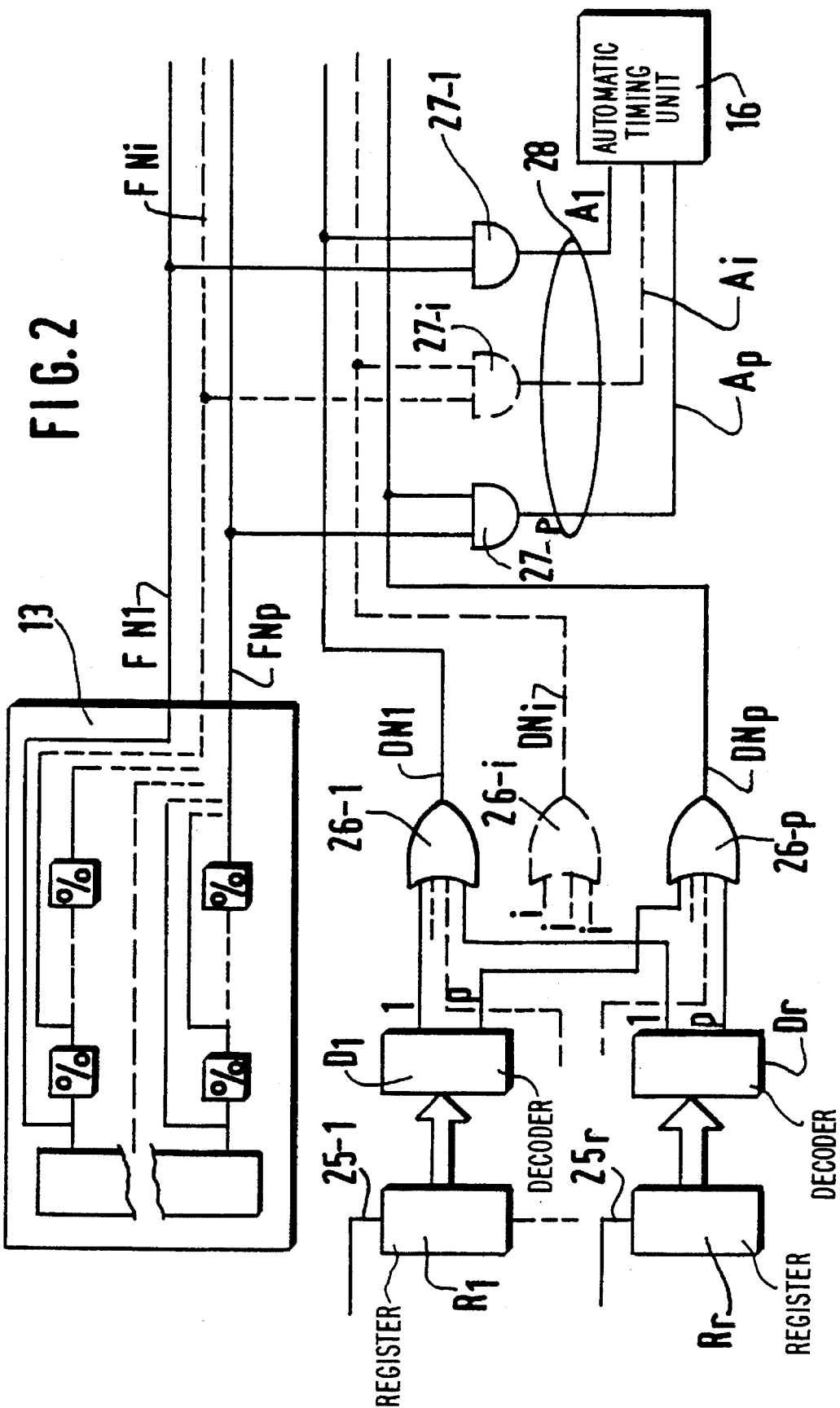

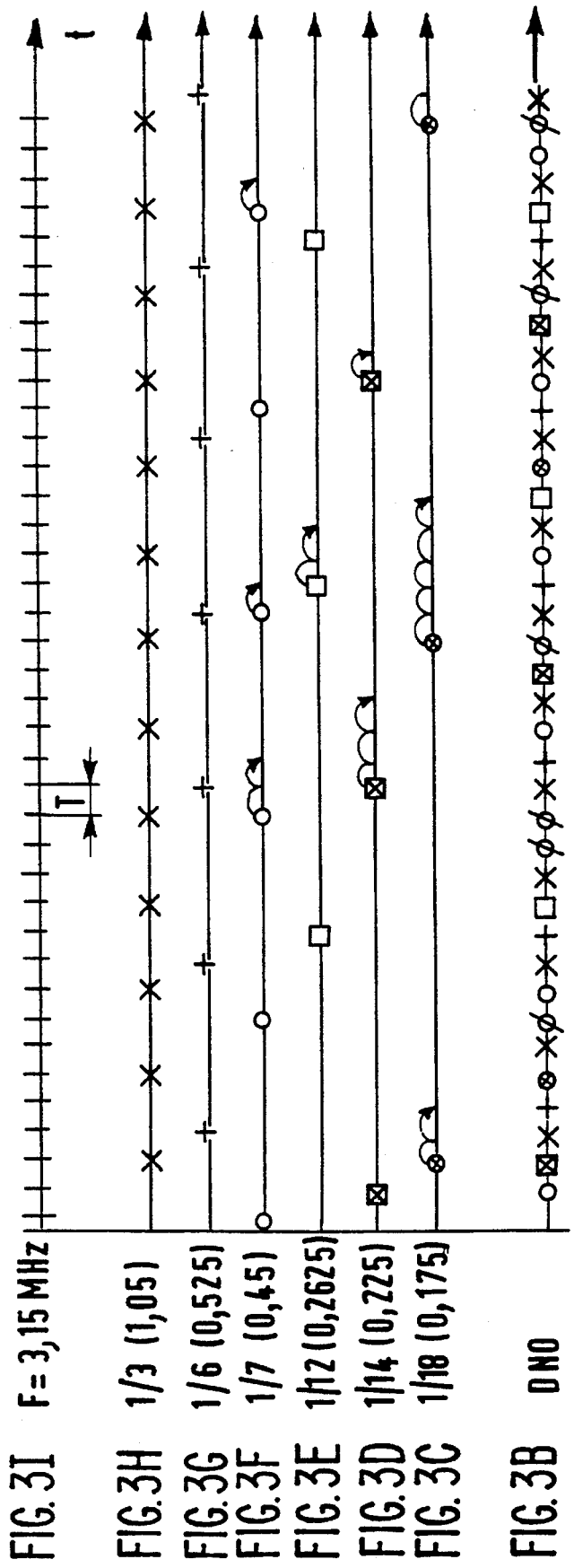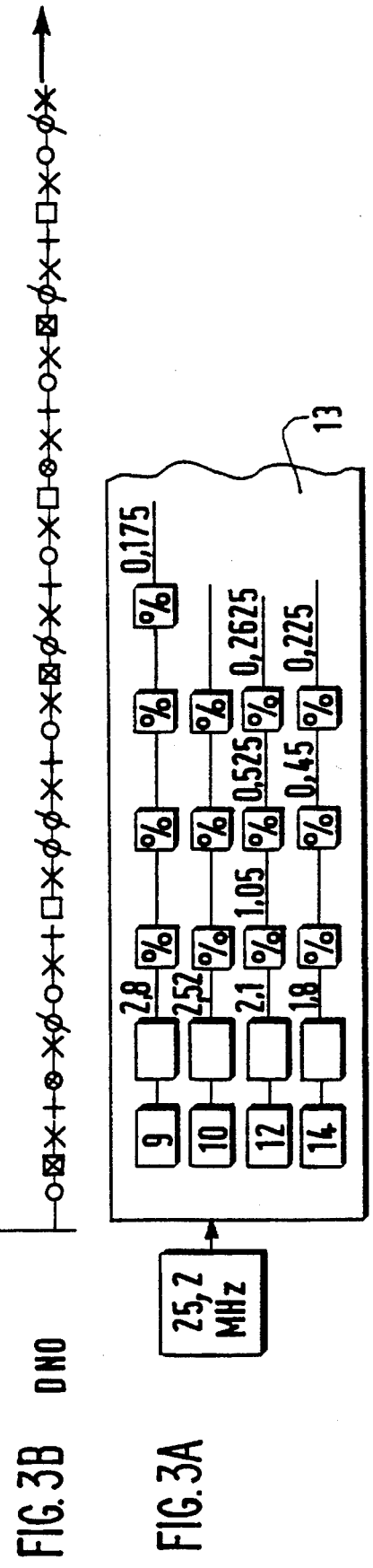

NETWORK WITH DATA RATE ADJUSTMENT FOR VIRTUAL CIRCUITS WITH ASYNCHRONOUS TIME DIVISION MULTIPLEX TRANSMISSION

BACKGROUND OF THE INVENTION

The invention relates to an ATM network comprising a data rate readjustment device for channels with input cells in the asynchronous time division technology (ATM virtual circuit), which channels are present at the input of a memory MC for cells and are constituted by separate digital lines or by an input multiplex carrier DNI, the said memory MC being formed by a plurality of r virtual circuit buffer memories, each cell of an activated channel being accommodated in that virtual circuit buffer memory whose identity is recognizable from the header of the said cell, while the output cells of the memory MC present on an output multiplex carrier DNO with a cell rate F are read from the said virtual circuit buffer memories by a readout address selection circuit.

The user of this device in the network may be a subscriber who has at his disposal a small number of channels, but advantageously it is the operator of a comparatively great number of virtual circuits, for example 128 or 256, established between several subscribers, in which case the device may be incorporated in a telecommunication exchange upstream of grading networks.

In an ATM transmission path, each cell of fixed length comprises a header which contains inter alia the identification number of the virtual circuit (or channel) to which it belongs. The header is followed by a message body which carries the useful information and has a fixed length. Such cells follow one another without interruption on the transmission line with a given fixed cadence which defines an appearance period T of the cell on the transmission line considered which will be referred to as cell time. The appearance rate of useful cells on the transmission line may vary. To safeguard the said regular period T when there is no message to be transmitted, a padding is provided in the form of empty cells of the same format as the useful cells, but carrying a standard, meaningless information. The same identification information is found in the headers of irregularly spaced cells which have the same destination.

The ATM transmission lines at the input side to be considered for the network according to the invention may be multiple, each of them constituting a single channel, may be arranged on a single multiplex carrier constituted by a single conductor or by several parallel conductors, or may be a combination of these two types of transmission line.

The envisaged aim, the problem to be resolved, is to rearrange the said input channels so that they are regrouped on an output multiplex carrier DNO, and to render the data rate of each of these channels regular, which data rates, which are generally different, are supposed to be known or which are at least measurable on the basis of an average appearance frequency of the cells. The data rates to be taken into account for the sources capable of feeding the various channels show a wide range of variation, which is indeed at present being standardized, and which may vary from a few kilobits per second (kb/s) to several hundreds of megabits per second (Mb/s). It is assumed for the ensuing description, moreover, that at least one of these data rates, referred to as the maximum channel data rate DCmax, is capable of exceeding half the maximum data rate F of the output multiplex carrier DNO. This means the presence of adjacent cells (in succession) on the multiplex DNO for such maximum data rates. By contrast, in the case of channel data rates DC such as DC<F/2, for which the presence of adjacent cell groupings is not necessary, the invention renders it possible to avoid this type of grouping which is considered undesirable and to optimize the spacing regularity of the cells emitted through each channel, taking into account the presence of the other channels on the same multiplex.

French Patent Application 2 653 284 discloses a device for regulating the data rates of virtual circuits which use an ATM transmission line. In this device, command means are provided which are so operated that the cells to be transmitted through the output line are read in the buffer memories in a sequence such that the cells issued by one and the same virtual circuit buffer memory are spaced apart on average at least by an interval determined for this virtual circuit. To obtain the regulation of the data rates, the cited Application has recourse to a solution which essentially lies in the field of software and which does not render it possible to obtain high operating speeds, given the very high information data rates involved. This may lead to problems especially during system reconfigurations following a change in the state or the data rate of the activated channels.

SUMMARY OF THE INVENTION

It is an object of the invention to obtain a rearrangement of the ATM channels while avoiding a repressive solution, which would consist in the rejection and loss of cells so as to avoid an overload on the ATM network.

Another object of the invention is to rearrange the ATM channels in such a manner as to give these channels the least possible delay during the regulation of their data rates.

Still another object is to render possible fast reconfigurations of the set of ATM channels to be rearranged.

According to the invention, the technical problem indicated above is resolved and the drawbacks of the prior art are attenuated or eliminated owing to the fact that the device described in the first paragraph is characterized in that it comprises:

first matching means which establish a one-to-one relationship between each activated channel and a predetermined level of priority, a rhythm synthesis table capable of providing pulse signals at all frequencies representative of the ATM cell data rates possible for the channels, second matching means which activate, at the output of the rhythm synthesis table, exclusively those pulse signals which have frequencies corresponding to the data rates of activated channels, an automatic timing unit for the activated channels which judges the pulses received from the said rhythm synthesis table at each cell time $T_j$ and which assigns thereto the corresponding activated channels and their associated priorities, and selection means for choosing the channel of highest priority on the basis of the highest priority derived in the said automatic timing unit at each subsequent cell time $T_{j+1}$ and for deriving therefrom a corresponding readout command to the said readout address selection circuit.

The generation, for each data rate of an activated channel, of a signal whose rhythm (frequency) is equal to the data rate associated with this channel, or to its average data rate, renders it possible to obtain the desired regulation by controlling the emission of cells at the output of the buffer memory relating to this channel at this rhythm. This optimum regulation may thus be obtained with certainty when only a single channel is activated. When several channels are activated, however, as is always the case in practice, the regulation process is complicated by the fact that emission requests are made simultaneously for different channels from time to time. Establishing an order of priorities, which translate at any given moment into a one-to-one correspondence between the total of activated channels and a set of priority values (rankings) according to a predetermined criterion, renders it possible to rearrange the necessary time sequence for the emission of the cells on the output multiplex DNO. Preferably, the said criterion is that the priority of an activated channel is higher (low priority number) in proportion as the data rate of this channel is greater. It is this selection which renders it possible to obtain the optimum regularity as to the emission period of the cells of each channel, and it causes a delay in the buffer memory associated with each channel which is longer in proportion as the data rate of the relevant channel is smaller.

A preferred embodiment of the invention is characterized in that the said first matching means comprise, in cascade arrangement starting from an input interface of the said cell memory MC: a programmable interface; a table of channels which provides each channel with an associated number NC1, ..., NCr, the data rate and the state (activated or not); an automatic priority assignment unit; and a table of priorities which establishes a one-to-one relationship between a first list of s numbers of activated channels NCA1, ..., NCAs (s≦r) and a second list of s individual priority values VP1, ..., VPs.

The ATM transmission system is designed for the variety fields of applications and the number of data rates to be provided is of the order of several hundreds, for example, distributed in steps from a few kb/s to a few hundred Mb/s. To achieve the synthesis of an equal number of rhythm frequencies, an advantageous embodiment of the invention is characterized in that the said rhythm synthesis table comprises a programming bus connected to n registers which are each connected to a cyclic counter which receives a clock signal HB (with a frequency N and a period $\tau$) for generating n base frequencies $f_1, f_2, \ldots, f_n$ (frequency values decreasing from 1 to n) so that $f_1$ is the maximum rhythm frequency corresponding to the maximum data rate DCmax which is possible for a channel, and in that $f_n > f_1/2$, while the other frequencies of lower value are obtained through successive division by means of q–1 dividers-by-two for each of the base frequencies $f_1, f_2, \ldots, f_n$, the total number of frequencies thus generated being equal to n×q=p.

This arrangement of the rhythm synthesis table forms a simple and effective means for generating a great number of regularly spaced frequencies, in which the number n may be of the order of several tens and the number q of stages of dividers-by-two in cascade arrangement is higher than 10.

Another embodiment of the invention which is compatible with the preceding ones is characterized in that the said second matching means, which provide the relationship between the rhythms and the activated channels, are formed, for at least each activated channel, by an index register connected to a decoder which comprises p positions at the output, among which positions only a position indicative of the channel data rate is activated, by a decoding bus with p conductors DN1 to DNp of which each is connected to the output of a logic OR gate whose inputs are connected to homologous outputs of the said decoders via a rhythm bus with p conductors, FN1 to FNp, coming from the said rhythm synthesis table, and by a supply bus of the said automatic timing unit with p conductors, $A_1$ to $A_p$, of which each conductor with serial number i, $A_i$, is connected to the relevant homologous conductors DNi and FNi via a logic AND gate.

To guarantee that the emission of a cell is not lost in time but is merely shifted through the interplay of the priorities established among the activated channels, another embodiment of the invention is characterized in that the said selection means for the channel of highest priority comprise a queue of non-selected channels connected through a bidirectional bus to the said automatic timing unit, which queue is so arranged as to store, at each cell time, the priority numbers previously determined in the said timing unit which have not yet been selected, and to merge them, at each subsequent cell time, with new priority numbers revised in the timing unit so as to form a priority order suitable for each cell time, from which the number of the channel of highest priority is lifted and provided to a selection member for selecting the corresponding channel.

The following description and the accompanying drawings, all given by way of non-limitative example, will make it clearly understood how the invention may be realised.

BRIEF DESCRIPTION OF THE DRAWINGS

FIG. 1 is a flowchart of the device in a network with data rate adjustment according to the invention.

FIG. 2 is a flowchart depicting an embodiment of the second matching means for providing the relationship between rhythms and activated channels suitable for use in the device of FIG. 1.

FIG. 3A shows an example of the way in which the sub-assembly providing the pulses may be activated by the said rhythm synthesis table.

FIGS. 3B–3I show, for the same embodiment as in FIG. 3A, the time diagrams which show the time distribution of a particular combination of pulses generated by the rhythm synthesis table of the device of FIG. 1.

SUMMARY OF THE INVENTION

The device of FIG. 1 is assumed to be present preferably in an exchange of a telecommunication network. It is designed for the treatment of cells according to the ATM technology, preferably in the form of a special circuit (ASIC). In the portion at the top of the Figure, on the left, an input multiplex carrier DNI is shown which comprises a certain number of ATM channels in series or in parallel. At the other side, the conductor 1, shown with a broken line, symbolizes one or several other independent input lines, each carrying an ATM channel. Each of the r input channels (DNI or 1), referenced NC1, ..., NCr, has a data rate $DC_i$ (the suffix i varying from 1 to r), while some of these data rates may be the same. In practice, the data rates $DC_i$ indicate the maximum data rates which the user must not exceed; by contrast, it is assumed that these data rates are fluctuating and irregular, which implies the presence of empty cells in accordance with a variable data rate, and an irregular appearance frequency in each channel.

The invention has for its object to readjust the data rates of the r channels mentioned above by regulating them according to the priority criterion previously defined, these channels being transmitted with regulated data rates on an output multiplex carrier DNO with a frequency F and a period T. The word regulated is understood to mean that the data rate of highest priority (priority ranking 1) appears at DNO with a constant appearance period of the useful cells of the associated channel, whereas there is a slight variation in the appearance period of the useful cells for all or some of the other priorities, which is rendered necessary in any case by the interweaving of the various data rates which must coexist on the multiplex DNO. The above rule applies strictly to data rates below F/2. In the opposite case, i.e. when there is a data rate higher than F/2 on the multiplex DNO, the regulation of this data rate will result in a repetitive appearance pattern of the useful cells, in which adjacent useful cells will be present.

The r input channels are supplied to a cell memory MC which comprises an input memory interface 2 and at least r virtual circuit buffer memories MC1, MC2, ..., MCr. Each input cell is guided in known fashion through the interface 2 to the buffer memory which corresponds to its channel on the basis of its channel identification which is recognizable in its header, which corresponds to a simple addressing operation. This channel simplicity is also transmitted by a conductor 3 from the memory interface 2 to a programmable interface 4, thus permanently providing to the latter the information as to which channels are active at the input of the memory MC. In addition, the interface 4 also receives the information relating to the data rate of each channel, for example, through counting of the incoming cells and averaging over time. The information on data rates may also be programmed at 4, or received from an external source in a manner not shown.

The data rates are adapted to the transmission system used, for example, the synchronous digital system SDH. The number of input channels r may reach a value of 256, i.e. the maximum number of channels allowed in the ATM technology, while the numbers of the channels NC 1, ..., NCr are expressed in the form of octets. The information relating to the input channels is provided to a table of channels 5 which passes it on in the form of a number from among r numbers NC1, ..., NCr, a data rate value, and a state from among two states: activated or not activated, which is translated at the electronic level simply by the presence of a logic 1 or 0. For a channel to be activated there are two necessary conditions: the channel considered must be present among the r input channels and the channel must be validated through programming by the interface 4. The complementary portion of FIG. 1 which is yet to be described relates exclusively to activated channels, i.e. s channel numbers: NCA1, ..., NCAs, from among NC1, ..., NCr (s≤r). The table 5 is connected through a bidirectional bus 6 to a consistency control member 7 which comprises an alarm block 8 and which also receives information from the programmable interface 4. The member 7 is governed by programmable parameters which depend on the system configuration; its function is particularly to verify that all data rates are lower than the maximum data rate DCmax which holds for a single channel, that the sum of the channel data rates is compatible with the data rate of the transmission system (data rate lower than the data rate F of DNO, and typically equal to 0.85 F), and that the number of channels activated simultaneously is compatible with the configuration of the network. Non-compliance with these conditions triggers an alarm in the block 8, which may lead to a modification in the programming of the interface 4. The information about the channels contained in the table 5 is provided to an automatic priority assignment unit 9 and to an automatic unit 11 for matching the generated rhythms to the activated channels. The automatic unit 9 has the function of generating a priority number corresponding to each number of an activated channel NCA1, ..., NCAs, according to a certain criterion. The chosen criterion is to associate a higher priority (a lower priority ranking number) in proportion as the data rate of the relevant channel is greater. Thus the channel with the highest data rate is given the priority number 1. A priority hierarchy is established for channels having the same data rates, in an arbitrary fashion or through programming, or by a different criterion which does not relate to the data rates. Thus s numbers for activated channels are obtained which are all different, to which numbers s different priority numbers VP1, ..., VPs correspond in a one-to-one manner. The automatic unit 9 provides the value pairs $NCA_1$-$VP_1$ (the suffix 1 varying from 1 to s) to a priority table 12. The assembly comprising the programmable interface 4, the table of channels 5 belonging to the consistency control member 7, the automatic priority assignment unit 9, and the table of priorities 12 constitute the first matching means.

It was described above that the information relating to the channels (number of each channel with its data rate and its state) is also supplied to the automatic unit 11. The object of this is to establish a second relationship between each channel and, not a priority value as described above, but a fixed frequency value (or rhythm) obtained through synthesis which is equal to or at least as close as possible to the data rate of the cells of this channel. If the synthesis of a great number of rhythms exactly equal to data rates possible for the channels is found to be difficult to realise, at least for certain data rate values, it is possible to associate with these data rates rhythms with frequencies which are preferably slightly higher than these data rates. Under these conditions, the possibility of providing a great number (p) of regularly spaced rhythms, for example 1000 rhythms lying between 1 kHz and 1 GHz, will render it possible to establish the second relationship between data rate and rhythm as desired, irrespective of the number (below 256) and the values of the data rates to be processed (for example lying between 1 kb/s and 1 Gb/s).

The fundamental element which is necessary for establishing this second relationship is a rhythm synthesis table 13. This table comprises registers 130-1, ..., 130-n which are filled each with a given counting value through a bus 14 (for example, with 12 conductors), which values ($V_1$, ..., $V_n$ in rising order) are all different, preferably regularly spaced, and such that the ratio $V_n/V_1$ is slightly higher than 2. The values $V_1$, ..., $V_n$ are provided as maximum counting values to cyclic counters 130-1, ..., 130-n, respectively. Each cyclic counter receives an external clock signal HB (with frequency N and period τ) provided, for example, by a quartz clock generator (not shown). This results in pulse signals with frequencies $f_1$, ..., $f_n$ (in order of decreasing value) at the outputs of the counters.

The frequency $f_1$ is the highest and the frequency $f_n$ is slightly higher than $f_1/2$. Each counter 131-1, ..., 131-n is connected to a divider-by-two 132-1, ..., 132-n, which dividers provide pulse signals with respective frequencies $f_1/2$, ..., $f_n/2$. Each divider-by-two is in its turn followed by a divider-by-two, and so on, down to the lowest frequencies desired after q successive division-by-two operations. The range of frequencies suitable for establishing the second relationship referred to above is thus obtained. For a digital application, when the highest data rate to be accommodated is equal to: DCmax=622 Mbits/s, a signal HB with N=50 Mhz and $V_1$=31, $V_2$=32, ..., $V_{34}$=67 (n=34) may be chosen, which implies that:

$f_1$=622 MHz, $f_2$=605 MHz, $f_3=558$ MHz, ...,
$f_{34}=316$ MHz.

The granularity of the data rates is below 3%.

With 13 stages of dividers-by-two (q=13) at the output of each cyclic counter, the lowest data rate can be: $316/2^{13}$, so less than 40 kbits/s.

It is evident that with 34 counters and 13 divider stages (n×q=p=442), one may readily cover a range of data rates from below 40 kbits/s to 622 Mbits/s with a granularity below 3%.

From these 442 frequencies, the automatic unit 11 selects the u frequencies which are equal to or slightly higher than the data rates of the s activated channels. Since some of these may have the same data rate, the number u is lower than or equal to s. The u pulse signals selected by any known means, particularly as described above with reference to FIG. 2, are transmitted through the connection 15, which may be a bus with p conductors, to an automatic timing unit 16 for the activated channels, which also receives the base clock signal HC of which the period coincides with the cell time T. The clock signal HC is derived from the multiplex carrier DNI or DNO. At each period of the signal HC, i.e. during each cell time (and through DNO), the automatic unit 16 may receive either no pulse, or one pulse, or several pulses. On average, it receives less than one pulse per period T, so that the condition prevails that on average the output multiplex DNO must not be saturated. At this stage, the aim is to accommodate each pulse received at 16 through emission over DNO of the oldest cell (if any) present in one of the buffer memories MC1, ..., MCr as quickly as possible, i.e. exactly that memory which relates to the same channel which is also at the basis of the emission through the rhythm synthesis table 13 of the pulse considered. This is the function which renders it possible to realise the portion of the device of FIG. 1 which remains to be described. If the pulse under consideration is the only one present during its reception by the automatic unit 16, the emission of the cell from the corresponding memory MC is performed immediately, i.e. during the cell time which follows that of the reception of the pulse in 16, in which case the establishment of a hierarchy of priorities for the channels will not be necessary. However, the arrival of the pulses at 16 more often takes place in an irregular manner, i.e. several pulses arrive during the same period T occasionally in the time frame formed by successive intervals of duration T. If all pulses are to be accommodated, therefore, it is necessary to perform two operations: the selection of pulses (i.e. of the channel) having the highest priority, and storage in a memory of the remaining pulse(s) yet to be subjected to this selection, which includes any pulses newly arriving during the next cell time. This instantaneous accumulation of pulses, which results in time shifts of cells to be transmitted over different channels compared with their theoretical transmission moments, has as its opposite counterpart the occasional occurrence of intervals of duration T during which no pulse at all is stored in the memory or arrives at the automatic unit 16, in which case the emission of an empty cell is commanded, represented by $\phi$, on the output multiplex DNO. The emission of empty cells on DNO simply reflects the fact that the multiplex DNO is not filled to capacity.

The storage of the non-selected pulse(s) and of the corresponding channel(s) is made in the form of priority values through a bidirectional bus 17, in a queue 18 of non-selected channels which also receives the clock signal HC. This information (supposing it is present at 18) is referred to the automatic unit 16 at each clock time. The automatic unit 16 also receives the information on the value pairs $NCA_1$-$VP_1$ from the table of priorities 12, either directly (not shown) or through the automatic unit 11, and then carries out a double transformation: from pulse to corresponding channel(s) and then from channel(s) to corresponding priority value(s) for each pulse received from table 13 during a period T. This results at 16 in a first sub-set of priority values with which a second sub-set of priority values derived from the queue 18 is amalgamated so as to constitute a set of y priority values. The highest priority is isolated from this set for the purpose of emission of the corresponding cell by MC (supposing that there is at least one cell in this cell memory). The y-1 remaining priorities are then transferred to 18 and the cycle repeats itself in the next cell time.

The selection of a channel takes place in physical terms through transmission at each period T of the priority value selected at 16, VPE, to a selection member 19 for the channel of highest priority, which member also receives the value pairs $NCA_1$-$VP_1$ from the table of priorities 12. The conversion from VPE to NCAE takes place in 19, NCAE being the number of the channel of highest priority, which is transmitted to a readout address selection circuit 21, from which it is transmitted in the form of a read command through a conductor 23 to the cell buffer memory for that same activated channel in the memory MC. Then follows the emission over the output multiplex DNO of the oldest cell in the buffer memory in question, or, if the latter is empty, the emission of an empty cell.

It is alternatively possible, at the cost of a slight complication of the device, to cause the emission of a cell of second highest priority instead of the first priority when the buffer memory related to this first priority is empty through transmission of the two first priorities of the set y and the two subsequent read commands to the memory MC, in which case it is obviously assumed that this reading of a cell of second highest priority is blocked when a cell of highest priority is present and may accordingly be emitted.

The absence during a time T of a priority value at 16 (y=0) results in the emission of an empty cell on DNO by any means known to those skilled in the art via the elements 19, 21 and MC. The time which separates the selection of a priority number at 16 and the emission of a cell over DNO is shorter than one cell time T.

When a channel data rate exceeds half the data rate of the multiplex DNO, which data rate is referred to as DCM, the result is that there will be successive cells present on the output multiplex DNO (mutually adjoining on the time scale). More precisely, the data rate DCM may be written as follows:

$$DCM = \frac{k_0 m + k_1(m-1) + \ldots + k_{m-1}}{k_0 m + k_1(m-1) + \ldots + k_{m-1} + \sum_{i=0}^{m-1} k_i} \times F$$

$k_0, \ldots, k_m$ being integers.

The above relation represents an optimum in that it expresses a physical distribution of cells on the multiplex DNO in which there are only isolated empty cells on this multiplex, so that the value of m, which is the maximum number of successive cells of one and the same channel, is reduced to a minimum. The device according to the invention renders it possible to obtain the distribution in conformity with the above relation when DCM is the data rate of the channel of highest priority. More generally, it is possible to limit the number of successive cells of the same channel which is allowable on the multiplex DNO to a maximum value P, this value P usually being a constraint which is imposed by the network. According to the invention, the observance of the maximum value P may be achieved through interposition of a limiter 22 arranged between the elements 18 and 19. According to this further refinement, a counting of identical successive priorities is carried out in 19. As long as the outcome of the count remains lower than P−1, the operations at 16, 18 and 19 will continue as described above. However, when the said value reaches P−1, the member 19 sends a transmission command to the queue 10 18 to transmit to the limiter 22 the highest priority in this queue which is different from that which has given rise to the succession of the preceding P−1 cells. This highest priority is now forced through in 19 by the limiter 22 during the next cell time, while a transmission of the priority from the automatic unit 16 is inhibited. If the queue is empty, accordingly, the limiter 22 commands the emission of an empty cell.

The device of FIG. 1 used in a network according to the invention offers the advantage that it permits of a rapid reconfiguration of the group of activated channels, typically over a period of two cell times (2T). To this end, it is necessary to double the capacity of the table of priorities 12, i.e. a second set of channel numbers should be installed therein which is to be related, in a one-to-one manner, to a second set of priority values. During the establishment of a new activated channel or the change in the state of one of the channels (change in data rate, or disconnection of a channel already established), the automatic priority assignment unit 9 provides the new one-to-one relationship between the above second set of channel numbers and priority values at 12, provided the new values still ensure the compatibility between the programming of the channel table 5 and the system configuration. It will be noted that this operation takes place in one cell time for data rates of up to Gb/s, in the CMOS 1µ technology, and that it is possible to use even faster technologies such as, for example, the ECL technology. During the composition of the new table for matching the channel numbers to the priority values, the device continues to operate in accordance with the old table of relationships. In the clock rhythm of the multiplex carrier DNO which follows the end of this modification, the new or modified channel is taken into account by the automatic unit 11 for matching the generated rhythms with the activated channels and, more generally, the new relationship table of channel numbers against priority values is taken into account by the device as a whole (particularly the elements 16 and 19). The device thus carries out a reconfiguration of the set of activated channels with a delay of 1 to 2 cell times of the multiplex carrier, which is a very short time in relation to the time required for establishing a channel.

In the device of FIG. 1, the automatic unit 11 constitutes second matching means between rhythms and activated channels, an embodiment of which is described below with reference to FIG. 2. As was described above, the table 5 contains the data rate and the state for each channel number NC1, ..., NCr. In practice, a list of data rates authorized for the channels is available, for example, 256 different values. These data rate values correspond to index values lying between 0 and 255, assuming that the index is coded by 8 bits. Each index value in its turn corresponds to a rhythm commanded by the automatic unit for adapting the generated rhythms to the activated channels.

The relationship between the channel numbers and the index numbers (possibly a same index number for several channels having the same data rate) may be established in the following manner:

each index value corresponding to at least one activated channel (validation bit activated in the state field of table 5) is entered into a register $R_1, \ldots, R_r$ (the number of registers is, for example, equal to 256 if the channel number is coded by eight bits, or may be limited to a lower value, s, equal to the maximum number of channels activated simultaneously). Each register, which also receives the said validation bit serving for its activation or deactivation through a respective conductor 25-1, ..., 25-r, is connected via a bus to a decoder $D_1, \ldots, D_r$ of which the number of output positions is equal to the number of possible index values (higher than or equal to r). To keep the description simple, it is assumed that the number of possible index values is equal to p (p=n.q, which is the number of rhythms generated by the table 13). Each decoder is only activated if the validation bit of the corresponding channel is activated. The output conductors of the decoder $D_1, \ldots, D_r$ represent three states and are connected to a common bus DN1, ..., DNp, via p logic OR gates 26-1, ..., 26-p, each of which comprises r inputs connected to the same number of respective outputs having the same serial numbers as the decoders $D_1, \ldots, D_r$. When a (any) decoder activates a decoding output position (only a single output can be activated at any one time), a conductor DNi from among DN1, ..., DNp will be activated and, conversely, the conductor DNi is only deactivated again when no decoder has activated it, which accordingly implies that this is a data rate value which is not used by any channel.

Moreover, the signals generated by the rhythm synthesis table 13 are united on an output bus $FN_1, \ldots, FN_p$. The two buses DNi, FNi are interconnected via logic AND gates 27-1, ..., 27-p so as to form a bus 28, $A_1, \ldots, A_i, \ldots, A_p$, connected to the automatic unit 16 of FIG. 1, and forming a possible realisation of the connection 15 in FIG. 1. In the bus 28, the conductor having number i is connected to the output of the AND gate 27-i of which the two inputs are connected to the conductors DNi and FNi, respectively.

FIG. 3 illustrates, to give a general idea, a simplified digital application for a set of six activated channels to be rearranged by the device of FIG. 1.

In FIG. 3A, the rhythm synthesis table 13, shown as a fragment only, supplies the six necessary frequencies. For this purpose, the table receives an external clock signal HB with a frequency N=25.2 MHz. Four registers are filled with the numbers 9, 10, 12 and 14. This results at the output of the counters connected to these registers in the base frequencies 2.8 MHz; 2.52 MHz; 2.1 MHz; and 1.8 MHz, respectively. The s=6 frequencies required are: $F_1$=175 kHz, obtained after four successive divisions by two of the mother frequency 2.8 MHz; $F_2$=1.05 MHz; $F_3$=525 kHz; $F_4$=262.5 kHz (first, second, third successive divisions by two of the mother frequency 2.1 MHz); $F_5$=450 kHz; $F_6$=225 kHz (second and third successive division-by-two of the mother frequency 1.8 MHz).

The output multiplex carrier being at the ffequency F=3.15 MHz, the frequencies $F_1$ to $F_6$ represent the following fractions of the data rate frequency F: 1/18, 1/3, 1/6, 1/12, 1/7, 1/14, respectively. An occupation rate of the output multiplex carrier results from this:

1/3+1/6+1/7+1/12+1/14+1/18=0.853 i.e. 85.3%.

With the priority increasing with the data rate, the distribution of the cells of the channels with the frequencies $F_1$ to $F_6$ over the output multiplex DNO is as shown in FIG. 3B.

The distribution is perfectly regular for the channel having the data rate F/3. This also holds for the channel with the data rate F/6, which is the second highest data rate, and a submultiple of the preceding one. For the other channels with lower data rates, there are delays in the emission of the cells represented by semicircles on the time axis. These delays, which may be multiple ones, statistically have an amplitude which is higher in proportion as the data rate is lower. In FIG. 3B, the output multiplex carrier DNO is shown, each channel having an individual cell symbol, with a cell time delay relative to the timing of the pulses for the various channels shown in the upper part of the Figure, i.e. the time necessary for the operation of the elements 16, 18, 19, 21. The emission of an empty cell is represented by the symbol φ on the multiplex DNO.

The assignment of increasing priorities to increasing data rates offers the advantage that interferences will take place substantially equally for all the channels, relatively speaking, owing to the fact that the greatest number of interferences will take place in the longest emission periods, i.e. a substantially constant relative variation in the emission period of the cells of each channel.

The device of the network according to the invention may be realised as an ASIC (Application Specific Integrated Circuit) with a clock generator which supplies the signal HB. This device has the advantage that it allows for a fast reconfiguration of the system of the order of 1 to 2 cell times for output data rates higher than Gb/s, which renders it possible to realise systems with an almost instantaneous data rate flexibility. Another advantage is that it provides an integrated solution while offering a total programming of the desired data rates and a fine grading thereof. For example, with a multiplex carrier of 155 Mb/s and an ASIC circuit realised in the CMOS 1μ technology, it is possible to obtain a grading of the order of a few kb/s for low data rates and about one hundred intermediate values for the data rates corresponding to the highest rhythms lying between $f_1$ and $f_1/2$. It is also possible to define the grading as a function of the optimum data rate for the application by means of a different configuration of the rhythm synthesis table (different number of dividers for each range).

The algorithm performed by the device according to the invention is independent of the realisation of the remaining equipment with which it is to cooperate. The information input rate is not a matter of consideration. It is even possible to buffer a channel as desired, and to emit it instantaneously at a lower data rate in order to alleviate a foreseen overloading of the network and, after the risk of overloading has disappeared, to increase the data rate of this channel quickly. It is finally noted that the device is completely independent of the transmission network used.

What is claimed is:

1. An ATM network including a data rate readjustment device for channels with input cells in an asynchronous time division technology, which channels are present at the input of a memory for cells, said memory being formed by a plurality of r virtual circuit buffer memories, each cell of an activated channel being accommodated in each of said virtual circuit buffer memories whose identity is recognizable from a header of the said cell, while the output cells of each of said memories present on an output multiplex carrier DNO with a cell rate F are read from the said virtual circuit buffer memories by a readout address selection circuit, said network comprising:

first matching means for establishing a one-to-one relationship between each activated channel and a predetermined level of priority;

a rhythm synthesis table for providing pulse signals at all frequencies representative of the cell data rates possible for the channels;

second matching means which activate, at the output of the rhythm synthesis table, exclusively those pulse signals which have frequencies corresponding to the data rates of activated channels;

an automatic timing unit for the activated channels which judges the pulses received from said rhythm synthesis table at each cell time $T_j$ and which assigns thereto the corresponding activated channels and their associated priorities; and selection means for choosing the channel of highest priority on the basis of the highest priority derived in said automatic timing unit at each subsequent cell time $T_{j+1}$ and for deriving therefrom a corresponding readout command to said readout address selection circuit.

2. A data rate readjustment device for channels with input cells in an asynchronous time division technology to be used in an ATM network said channels being present at the input of a cell memory, said memory being formed by a plurality of r virtual circuit buffer memories, each cell of an activated channel being accommodated in each of said virtual circuit buffer memories whose identity is recognizable from the header of the said cell, while the output cells of the memory present on an output multiplex carrier DNO with a cell rate F are read from the said virtual circuit buffer memories by a readout address selection circuit, comprising:

first matching means for establishing a one-to-one relationship between each activated channel and a predetermined level of priority;

a rhythm synthesis table for providing pulse signals at all frequencies representative of the cell data rates possible for the channels;

second matching means which activate, at the output of said rhythm synthesis table, exclusively those pulse signals which have frequencies corresponding to the data rates of activated channels;

an automatic timing unit for the activated channels which judges the pulses received from said rhythm synthesis table at each cell time $T_j$ and which assigns thereto the corresponding activated channels and their associated priorities; and selection means for choosing the channel of highest priority on the basis of the highest priority derived in said automatic timing unit at each subsequent cell time $T_{j+1}$ and for deriving therefrom a corresponding readout command to said readout address selection circuit.

3. A data rate readjustment device as claimed in claim 2, wherein said first matching means includes, in cascade arrangement starting from an input interface of the said cell memory MC: a programmable interface; a table of channels which provides each channel with an associated number NC1, ..., NCr, the data rate and the state; an automatic priority assignment unit; and a table of priorities which establishes a one-to-one relationship between a first list of s numbers of activated channels NCA1, ..., NCAs (s≦r) and a second list of s individual priority values VP1, ..., VPs.

4. A data rate readjustment device as claimed in claim 2, wherein said rhythm synthesis table comprises a programming bus connected to n registers which are each connected to a cyclic counter which receives a clock signal HB, with a frequency N and a period τ for generating n base frequencies $f_1, f_2, \ldots, f_n$, frequency values decreasing from 1 to n so that $f_1$ is a maximum rhythm frequency corresponding to the maximum data rate DCmax which is possible for a channel, and in that $f_n > f_1/2$, while the other frequencies of lower value are obtained through successive division by means of q−1 dividers-by-two for each of the base frequencies $f_1, f_2, \ldots, f_n$, wherein q is an integer, the total number of frequencies thus generated being equal to n x q=p.

5. A data rate readjustment device as claimed in claim 4, wherein said rhythm synthesis table receives a clock signal HB of 50 MHz provided by a quartz clock generator, so that: $f_1$=622 MHz, n is of the order of 35, and a minimum rhythm frequency $f_p$ is of the order of 40 kHz, while the number p of rhythm frequencies provided is of the order of 450.

6. A data rate readjustment device as claimed in claim 2, wherein said second matching means, which provides the relationship between pulse Signals and the activated channels, are formed, for at least each activated channel, by an index register and further including a decoder coupled to said index register which comprises p positions at the output, among which positions only one position indicative of the channel data rate is activated, by a decoding bus with p conductors DN1 to DNp of which each is connected to the output of a logic OR gate whose inputs are connected to homologous outputs of said decoder via a rhythm bus with p conductors, FN1 to FNp, coming from the said rhythm synthesis table, and by a supply bus of the said automatic timing unit with p conductors, $A_1$ to $A_p$, of which each conductor with serial number i, $A_i$, is connected to the relevant homologous conductors DNi and FNi via a logic AND gate.

7. A data rate readjustment device as claimed in claim 2, wherein said selection means for the channel of highest priority comprise a queue of non-selected channels connected through a bidirectional bus to the said automatic timing unit, which queue is so arranged as to store, at each cell time, the priority numbers previously determined in the said timing unit which have not yet been selected, and to merge them, at each subsequent cell time, with new priority numbers revised in the timing unit so as to form a priority order suitable for each cell time, from which the number of the channel of highest priority is lifted and provided to a selection member for selecting the corresponding channel.

8. A data rate readjustment device as claimed in claim 7, further including a limiter for the maximum number m of consecutive cells in the same channel which it is possible to emit on the said output multiplex DNO, which said limiter is connected on the one hand to the said queue and on the other hand to the said selection member for the channel of highest priority, a supplementary connection being in addition provided between these two latter elements.

9. A data rate readjustment device as claimed in claim 2, in which the priority of an activated channel increases in proportion as the data rate of this channel increases.

10. A data rate readjustment device as claimed in claim 3, wherein said one-to-one relationship table includes a second set of channel numbers to be related, in one-to-one fashion, to a second set of priority values.

11. A data rate readjustment device as claimed in claim 3, wherein said rhythm synthesis table comprises a programming bus connected to n registers which are each connected to a cyclic counter which receives a clock signal HB (with a frequency N and a period τ) for generating n base frequencies $f_1, f_2, \ldots, f_n$ (frequency values decreasing from 1 to n) so that $f_1$ is the maximum rhythm frequency corresponding to the maximum data rate DCmax which is possible for a channel, and in that $f_n > f_1/2$, while the other frequencies of lower value are obtained through successive division by means of q−1 dividers-by-two for each of the base frequencies $f_1, f_2, \ldots, f_n$, wherein q is an integer, the total number of frequencies thus generated being equal to n×q=p.

12. A data rate readjustment device as claimed in claim 3, wherein said second matching means, which provide the relationship between pulse signals and the activated channels, are formed, for at least each activated channel, by an index register and further including a decoder coupled to said index register which comprises p positions at the output, among which positions only one position indicative of the channel data rate is activated, by a decoding bus with p conductors DN1 to DNp of which each is connected to the output of a logic OR gate whose inputs are connected to homologous outputs of said decoder via a rhythm bus with p conductors, FN1 to FNp, coming from the said rhythm synthesis table, and by a supply bus of the said automatic timing unit with p conductors, $A_1$ to $A_p$, of which each conductor with serial number i, $A_i$, is connected to the relevant homologous conductors DNi and FNi via a logic AND gate.

13. A data rate readjustment device as claimed in claim 4, wherein said second matching means, which provide the relationship between pulse signals and the activated channels, are formed, for at least each activated channel, by an index register and further including a decoder coupled to said index register which comprises p positions at the output, among which positions only one position indicative of the channel data rate is activated, by a decoding bus with p conductors DN1 to DNp of which each is connected to the output of a logic OR gate whose inputs are connected to homologous outputs of said decoder via a rhythm bus with p conductors, FN1 to FNp, coming from the said rhythm synthesis table, and by a supply bus of the said automatic timing unit with p conductors, $A_1$ to $A_p$, of which each conductor with serial number i, $A_i$, is connected to the relevant homologous conductors DNi and FNi via a logic AND gate.

14. A data rate readjustment device as claimed in claim 3, wherein said selection means for the channel of highest priority comprise a queue of non-selected channels connected through a bidirectional bus to the said automatic timing unit, which queue is so arranged as to store, at each cell time, the priority numbers previously determined in the said timing unit which have not yet been selected, and to merge them, at each subsequent cell time, with new priority numbers revised in the timing unit so as to form a priority order suitable for each cell time, from which the number of the channel of highest priority is lifted and provided to a selection member for selecting the corresponding channel.

15. A data rate readjustment device as claimed in claim 4, wherein said selection means for the channel of highest priority comprise a queue of non-selected channels connected through a bidirectional bus to the said automatic timing unit, which queue is so arranged as to store, at each cell time, the priority numbers previously determined in the said timing unit which have not yet been selected, and to merge them, at each subsequent cell time, with new priority numbers revised in the timing unit so as to form a priority order suitable for each cell time, from which the number of the channel of highest priority is lifted and provided to a selection member for selecting the corresponding channel.

16. A data rate readjustment device as claimed in claim 3, in which the priority of an activated channel increases in proportion as the data rate of this channel increases.

17. A data rate readjustment device as claimed in claim 4, in which the priority of an activated channel increases in proportion as the data rate of this channel increases.

18. A data rate readjustment device as claimed in claim 11, wherein said one-to-one relationship table includes a second set of channel numbers to be related, in one-to-one fashion, to a second set of priority values.

* * * * *